(12) United States Patent
Schroeder et al.

(10) Patent No.: US 11,785,185 B2
(45) Date of Patent: Oct. 10, 2023

(54) SYSTEMS AND METHODS FOR VALIDATING IMAGERY COLLECTED VIA UNMANNED AERIAL VEHICLES

(71) Applicant: Verizon Patent and Licensing Inc., Basking Ridge, NJ (US)

(72) Inventors: Tera Lynn Schroeder, West Linn, OR (US); Mark Reynolds Williamson, Portland, OR (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/481,825

(22) Filed: Sep. 22, 2021

(65) Prior Publication Data

US 2023/0085740 A1  Mar. 23, 2023

(51) Int. Cl.
| | |
|---|---|
| *H04N 7/18* | (2006.01) |
| *G06T 1/00* | (2006.01) |
| *G05D 1/00* | (2006.01) |
| *B64C 39/02* | (2023.01) |
| *H04N 23/661* | (2023.01) |
| *H04W 84/04* | (2009.01) |
| *B64U 101/30* | (2023.01) |

(52) U.S. Cl.
CPC ............ *H04N 7/183* (2013.01); *B64C 39/024* (2013.01); *G05D 1/0016* (2013.01); *G06T 1/0007* (2013.01); *H04N 23/661* (2023.01); *B64U 2101/30* (2023.01); *B64U 2201/20* (2023.01); *H04W 84/042* (2013.01)

(58) Field of Classification Search
CPC .... H04N 7/183; B64C 39/024; G05D 1/0016; G06T 1/0007
USPC ........................................................ 348/144
See application file for complete search history.

(56) References Cited

U.S. PATENT DOCUMENTS

2019/0004543 A1\* 1/2019 Kennedy ................. G06T 5/002

\* cited by examiner

*Primary Examiner* — On S Mung

(57) ABSTRACT

A user device may include a memory and a processor. The user device may send, via a cellular network, instructions to an unmanned aerial vehicle (UAV). The instructions may include instructions to capture a plurality of first images while the UAV is in flight. The user device may receive, while the UAV is in flight, one or more second images via a wireless wide area network. The one or more second images may be lower resolution versions of a subset of the first plurality of images. The user device may store the one or more second images at the user device.

20 Claims, 5 Drawing Sheets

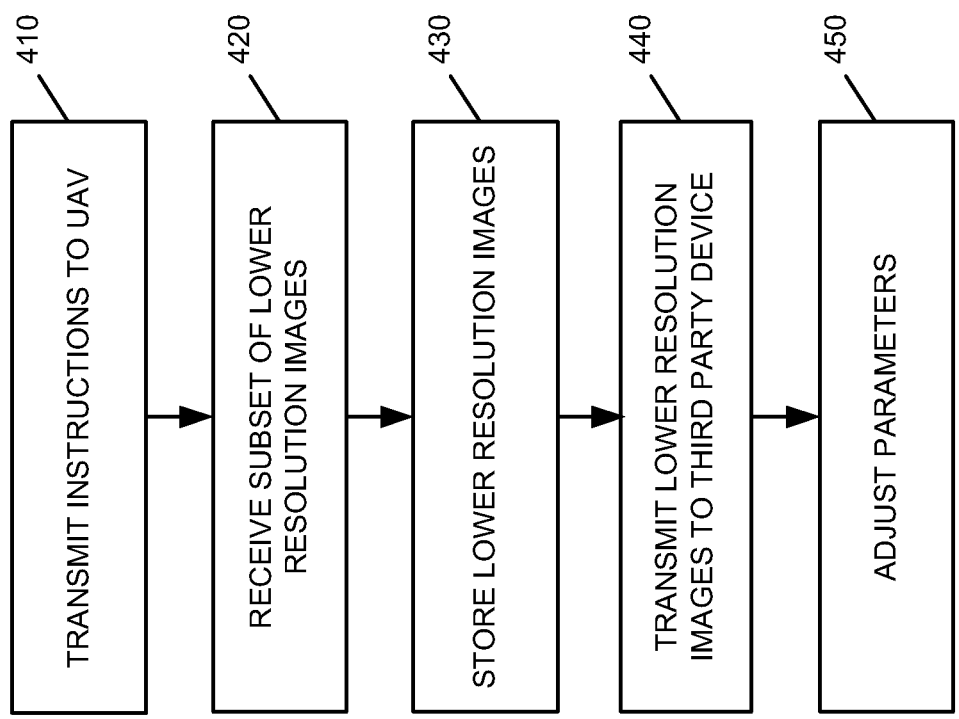

SYSTEMS AND METHODS FOR VALIDATING IMAGERY COLLECTED VIA UNMANNED AERIAL VEHICLES

BACKGROUND INFORMATION

The use of Unmanned Aerial Vehicles (UAVs), also referred to as drones, is increasing. Drones can fly over large distances and are operated by a controller over a cellular network. In addition, many drones collect images, such as photographs, videos, or sensor imagery. Sending images over a cellular network can present challenges due to the amount of bandwidth required to transmit images.

BRIEF DESCRIPTION OF THE DRAWINGS

FIG. 4 is a flow diagram illustrating processing associated with validating imagery in accordance with an exemplary implementation.

DETAILED DESCRIPTION OF EXAMPLE EMBODIMENTS

Figure 1:
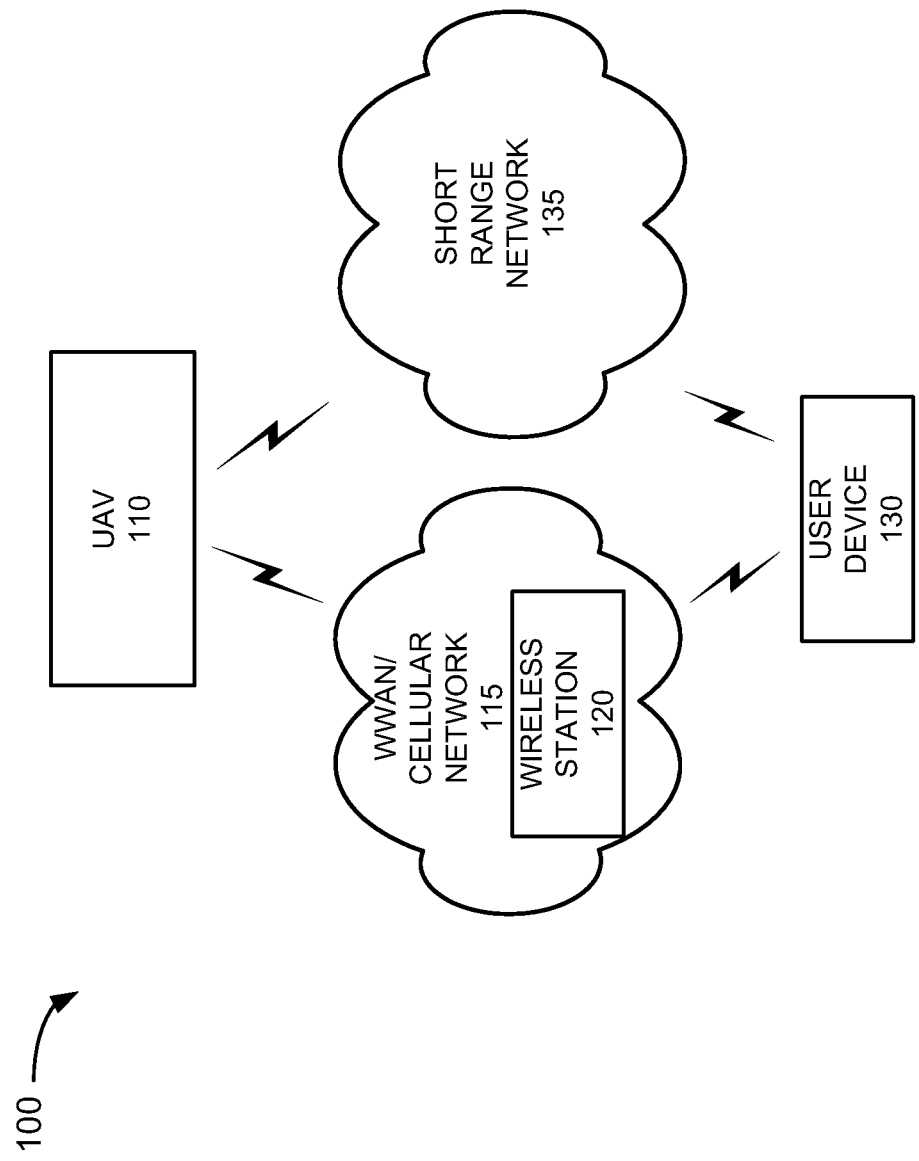
FIG. 1 illustrates an exemplary environment in which systems and methods described herein may be implemented.

The following detailed description refers to the accompanying drawings. The same reference numbers in different drawings may identify the same or similar elements.

More and more frequently, drones are being used to perform remote sensing functions, such as collecting imagery. The imagery may include still images (e.g., individual photographs), video images, images from sensors (e.g., Light Detection and Ranging (LiDAR) sensors, thermal imaging sensors, or other types of sensors), or other types of images.

The drones may receive control signals from a controller and may transmit images to the controller. In some situations, a drone may include short range wireless communication capability (e.g., WiFi) to communicate with the controller via WiFi frequency bands. However, the range of the short range wireless communication may be limited. Drone missions may need to extend beyond the limitations of short range wireless communication. Therefore, drone users may need to fly drones over a wireless wide-area network (WWAN), such as terrestrial cellular network, a satellite network, or some combination of the two.

Transmitting images via some WWANs may provide a number of challenges. For example, transmitting a large number of high resolution images may use large amounts of bandwidth. If several drones are attempting to transmit large amounts of high bandwidth data, the WWAN may become congested, which may lead to a low quality of service for users. For example, it may take a long time for the images to arrive at the controller, or the images may never arrive at the controller due to dropped packets. To illustrate one example, in some situations, up to 2000 images may be captured in a one-hour flight and each image may be 6-8 megabytes (MB) in size. With an uplink limitation of, for example, 2 megabits per second (Mbps), transmitting all of the images to a controller via a WWAN may take longer than the length of the flight. In addition, transmitting large amounts of data in the form of images may be expensive for a user. For example, a user may subscribe to a service that charges based on an amount of data consumed. If the user is transmitting a large number of images or real time video at full resolution, transmissions during a drone flight may be costly.

In some situations, a user may find it acceptable to receive a small number of lower resolution images from the drone while the drone is in the air. For example, in one situation, a user may want to validate that images are being captured correctly while the drone is in the air. For example, the user may want to make sure that the correct set of image capture settings are being applied, that the angle of the sun is correct, or there is nothing on the lens that would ruin the images. In another situation, a user such as building owner or lender may want observations that a construction project is being worked in a timely manner—personnel and/or materials are on site, certain levels of completion have been achieved—and the user may not immediately require high resolution images to provide the verification. In another example, a user may want to use the information in the lower resolution images to detect items of interest in real time so that the drone can be directed to perform more extensive imaging of certain features while still in flight.

Implementations described herein may provide a drone controller with a subset of lower resolution images over a cellular network while the drone is in the air. For example, the drone may transmit lower resolution images, such as thumbnail images, to the controller while the drone is flying. The transmitted lower resolution images may be a subset of a larger number of high resolution images taken while the drone is in flight. The drone may additionally store the high resolution images for retrieval after the flight has been completed. In one implementation, the drone may transmit the subset of low resolution images to the controller on a periodic basis. In another implementation, the drone may transmit the low resolution image to the controller in response to a command from the controller. The controller may receive the low resolution images and the low resolution images may be stored on the controller. In one implementation, the low resolution images may be transmitted from the controller to another device during or after the drone flight.

FIG. 1 is a diagram illustrating an exemplary environment in which systems and methods described herein may be implemented. Referring to FIG. 1, environment 100 includes UAV 110 (also referred to herein as drone 110), Wireless Wide-Area Network 115 (in this example, a cellular network), wireless station 120-1, 120-2 and 120-3 (referred to individually as wireless station 120 and collectively as wireless stations 120), and user device 130. It should be understood that environment 100 may include a large number of UAVs 110 (e.g., dozens or more) and additional wireless stations 120 and user devices 130.

UAV 110 may include an aircraft (e.g., a single rotor aircraft, multirotor aircraft or fixed wing aircraft) that receives control signals from user device 130. In implementations described herein, UAV 110 may receive signals from a transmitter associated with user device 130 to control the flight of UAV 110. For example, the rotational speed of each rotor for a multirotor UAV 110 may be adjusted individually via signals from user device 130 to maneuver UAV 110 based on the particular flight goals. Consistent with implementations described herein, UAV 110 includes a camera and/or various sensors to capture images and data. UAV 110 further includes storage (e.g., a Secure Digital (SD) card or other type of storage device) and wireless communication interface to store and transmit the images and additional data as described in additional detail below.

WWAN 115 (e.g., cellular network 115) may include a communication network, such as a fourth generation (4G) long term evolution (LTE) network, a fifth generation (5G) network, etc. Additionally, cellular network 115 may include functionality such as a mm-wave Radio Access Network (RAN); advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); carrier aggregation; relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of 5G functionality. WWAN 115 may also include a satellite-based network (not shown) in which UAV 110 and user device 130 communicate via one or more satellites.

Wireless station 120 may service a set of user equipment (UE) devices (not shown) that may include UAV 110 and user device 130. For example, wireless stations 120 may be part of cellular network 115, which couples UE devices to a core network to receive telephone, data and multi-media data. In one implementation, wireless station 120 may include a 5G base station (e.g., a next generation NodeB (gNB)) that includes one or more radio frequency (RF) transceivers. For example, wireless station 120 may include three RF transceivers and each RF transceiver may service a 120 degree sector of a 360 degree field of view. Each RF transceiver may include or be coupled to an antenna array. The antenna array may include an array of controllable antenna elements configured to send and receive 5G new radio (NR) wireless signals via one or more antenna beams. The antenna elements may be digitally controllable to electronically tilt or adjust the orientation of an antenna beam in a vertical direction and/or horizontal direction. In some implementations, wireless station 120 may also include a 4G base station (e.g., an evolved NodeB (eNodeB)) that communicates wirelessly with UE devices located within the service range of wireless station 120.

User device 130 may include a controller to control operation of UAV 110. For example, user device 130 may include a user interface to allow a user to control the flight pattern of UAV 110, receive information from various sensors on UAV 110, operate a camera on UAV 110, read information from various sensors on UAV 110, etc. In one implementation, user device 130 may store an application (e.g., a ground control station (GCS) application) and a drone pilot may operate UAV 110 using the application. For example, the drone pilot may access the application to determine a location of UAV 110, receive telemetry information from UAV 110, send commands to UAV 110, change a flight pattern associated with UAV 110, receive images from UAV 110, and perform additional operations with respect to UAV 110.

In some implementations, user device 130 may be located in relatively close proximity to UAV 110 and control operation of UAV 110 wirelessly via short range network 135. Short range network 135 may include a WiFi network or another type of short range network that allows UAV 110 to wirelessly communicate with user device 130 when UAV 110 and user device 130 are in relatively close contact.

In other implementations, user device 130 may be located remotely with respect to UAV 110. In this implementation, user device 130 may include any computer device used to transmit information to UAV 110 (e.g., commands) and receive data from UAV 110 (e.g., images, telemetry information). For example, user device 130 may include a mobile phone, laptop computer, tablet computer, desktop computer, wearable computer (e.g., eyeglasses or wristwatch), etc., that includes communication functionality and is able to provide, for example, commands to UAV 110 via cellular network 115 and receive images from UAV 110 via WWAN 115, such as cellular network 115, a satellite network (not shown), etc., as described in detail below.

Figure 2:
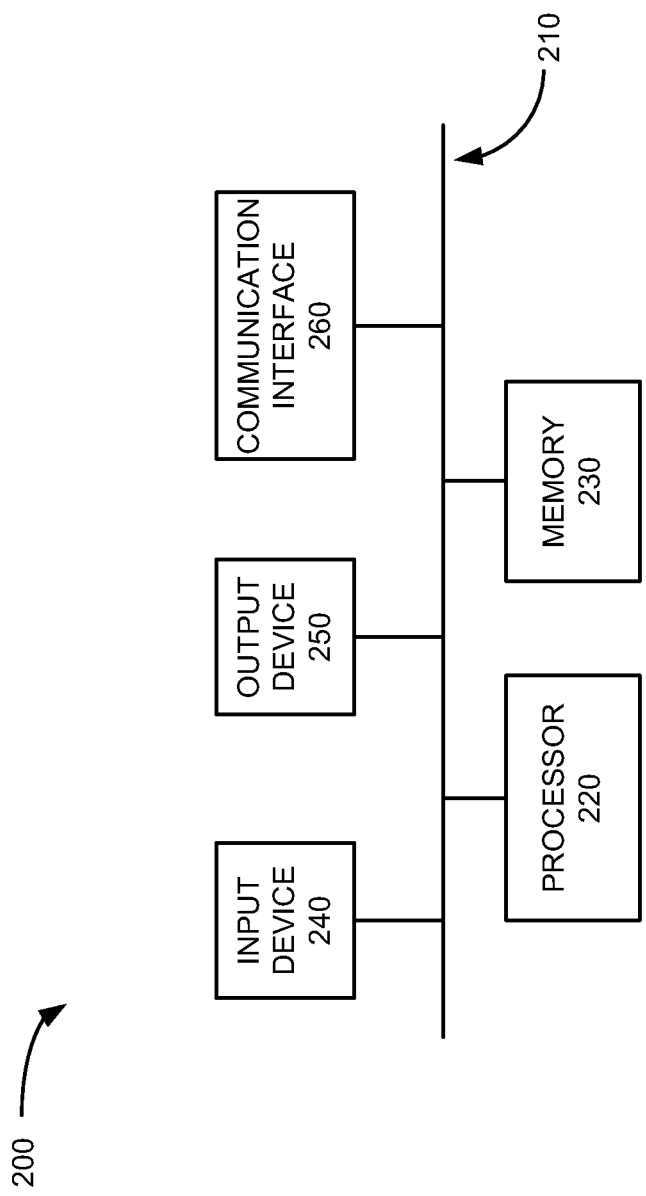
FIG. 2 is a block diagram of components implemented in one or more of the elements of the environment of FIG. 1 in accordance with an exemplary implementation.

FIG. 2 illustrates an exemplary configuration of a device 200. One or more devices 200 may correspond to or be included in UAV 110, wireless station 120, and user device 130. Referring to FIG. 2, device 200 may include bus 210, processor 220, memory 230, input device 240, output device 250, and communication interface 260. Bus 210 may include a path that permits communication among the elements of device 200.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SSD). Memory 230 may also include a magnetic and/or optical recording medium (e.g., a hard disk) and its corresponding drive.

Input device 240 may include a mechanism that permits a user to input information, such as a keypad, a keyboard, a mouse, a pen, a microphone, a touch screen, voice recognition and/or biometric mechanisms, etc. Output device 250 may include a mechanism that outputs information to the user, including a display (e.g., a liquid crystal display (LCD)), a speaker, etc. In some implementations, device 200 may include a touch screen display may act as both an input device 240 and an output device 250.

Communication interface 260 may include one or more transceivers that device 200 uses to communicate with other devices via wired, wireless or optical mechanisms. For example, communication interface 260 may include one or more radio frequency (RF) transmitters, receivers, and/or transceivers and one or more antennas for transmitting and receiving RF data. Communication interface 260 may also include a modem or an Ethernet interface to a LAN or other mechanisms for communicating with elements in a network.

The exemplary configuration illustrated in FIG. 2 is provided for clarity. It should be understood that device 200 may include more or fewer components than illustrated in FIG. 2. For example, for a device 200 implemented in UAV 110, device 200 may include a positioning system/satellite navigation system, such as a global positioning system (GPS) component, which may provide position information in relation to a standard reference frame, sensors and control circuitry to control and/or monitor the flight of UAV 110, a camera to capture images, as well as a battery to power UAV 110.

In an exemplary implementation, device 200 performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3A:
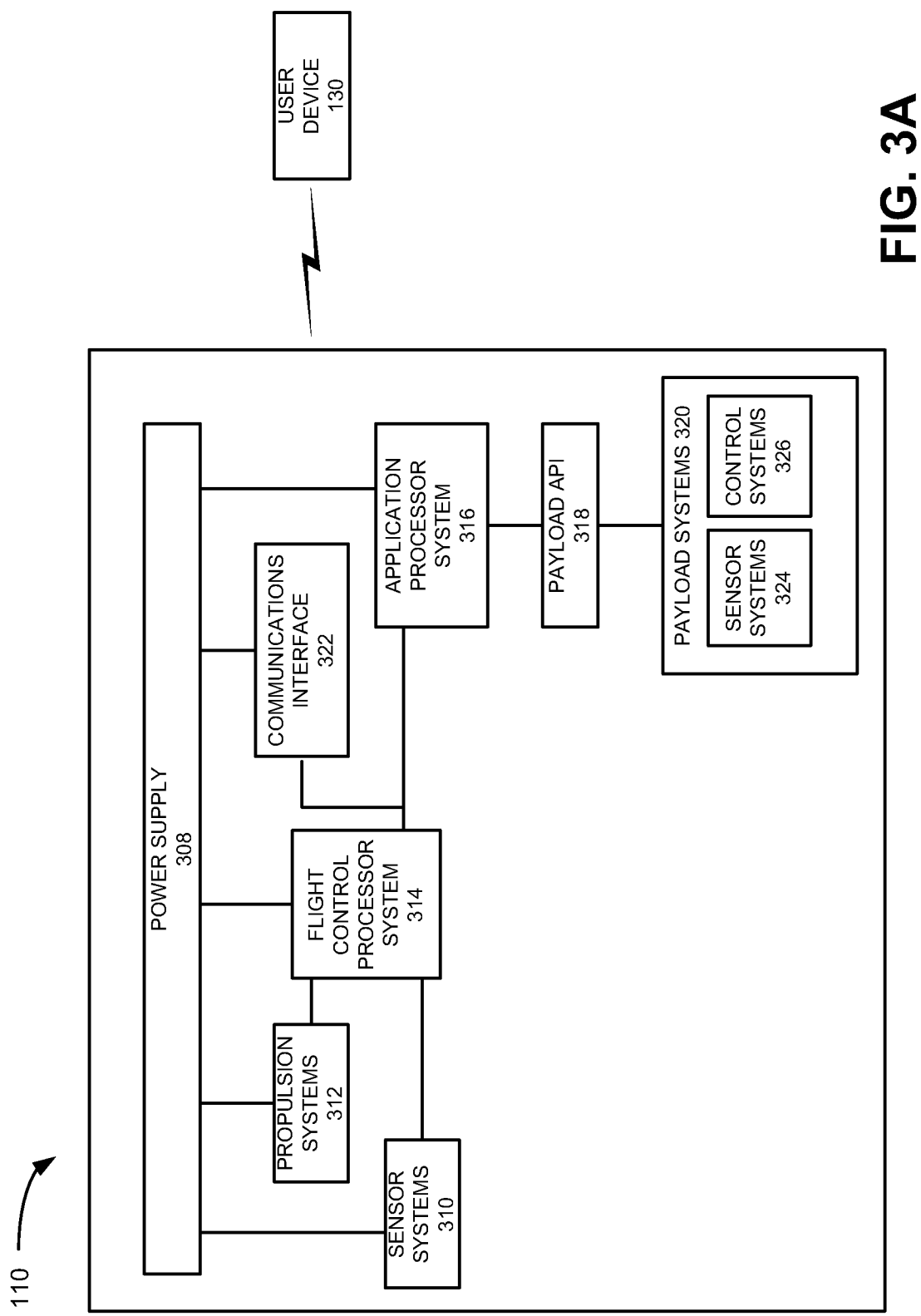
FIG. 3A is a block diagram of components implemented in the UAV of FIG. 1 in accordance with an exemplary implementation.

FIG. 3A illustrates an exemplary configuration of components implemented in UAV 110 in accordance with one implementation. Referring to FIG. 3A, UAV 10 may include power supply 308, sensor systems 310, propulsion systems 312, flight control processor system 314, application processor system 316, payload application programming interface (API) 318, payload systems 320 and communications interface 322. The components illustrated in FIG. 3A may be interconnected by one or more buses to allow some or all of the components illustrated in FIG. 3A to communicate with one another.

Power supply 308 may include one or more rechargeable batteries that power the components of UAV 110. In some instances, power supply 308 may include a solar panel and converter that converts sunlight into electrical energy and stores the electrical energy in a battery. Sensor systems 310 may include one or more sensors, such as a GPS receiver component that receives positioning system information in relation to a standard reference frame, such as latitude and longitude coordinates and altitude measurements. Sensor systems 310 may also include movement sensors such as accelerometers, gyroscopes, air-speed sensors and directional sensors (e.g., magnetometers), as well as climate sensors such as barometers and thermometers.

Propulsion systems 312 may include elements to allow UAV 110 to fly. For example, UAV 110 may be a single rotor, multi-rotor aircraft or fixed wing aircraft. In such implementations, propulsion system 312 may include the single rotor, multiple rotors, etc., and one or more motors that operate the rotor(s) to enable UAV 110 to fly.

Flight control processor system 314 may include one or more processors or processing logic that execute applications to perform flight control operations (e.g., propulsion direction, speed). Flight control processor system 314 may receive commands from, for example, user device 130 (e.g., through communications interface 322) and/or pre-programmed flight instructions to control the flight of UAV 110. The commands may be received over a WWAN, such as cellular network 115 or a satellite network, or via short range network 135. In other instances, flight control processor system 314 may be programmed to fly to a certain location on a particular route.

Application processor system 316 may include one or more processors or processing logic that executes one or more application programs. Application processor system 316 may allow for the execution of applications separately from mission critical applications (e.g., flight control) which instead may be executed as part of flight control processor system 314. In some implementations, applications processor system 316 may provide processes to expose user interfaces to user devices 130 to provide/receive flight control information (e.g., telemetry information, flight control commands). In some implementations, application processor system 316 may allow for the execution of applications associated with specific mission objectives, such as an application program associated with generating and providing images, such as images obtained via one or more high resolution cameras included on UAV 110, to other devices in environment 100. For example, consistent with embodiments described herein, application processor system 316 may include storage facilities to allow the storage of high resolution images for forwarding to other devices/systems after a flight for UAV 110 has been completed.

In one implementation, application processor system 316 may include and/or interface with a payload application programming interface (API) 318 that allows devices included in a payload to interface with UAV 110 (e.g., to use the communications interface 322). For example, payload API 318 may allow systems included in a payload to obtain flight information from UAV 110, such as location information, telemetry information, etc. Payload API 318 may also allow user device 130 to obtain payload data from UAV 110 (e.g., through communications interface 322), such as high resolution images, as described in more detail below.

Payload systems 320 may be systems included as payloads on UAV 110. Examples of payload systems can be high definition imaging systems, environmental sensing systems, parcel transport systems, communications systems, and more. Payload systems 320 may interface with payload API 318 to receive/provide data. For example, payload systems 320 may include sensor systems 324 and control systems 326. Sensor systems 324 may receive data from sensor systems 310 described above and provide sensor data, such as telemetry information including speed, direction, altitude, etc., of UAV, to payload API 318. Sensor systems 324 may also include one or more high resolution cameras that generate images and/or video of various items of interest, and provide such images/videos to users via payload API 318 and/or store the images for later retrieval. Control systems 326 may provide UAV flight control information, such as location, altitude, etc., which may then be provided to, for example, user device 130, via payload API 318.

Communications interface 322 may include one or more transceivers that UAV 110 uses to communication with other devices via wired, wireless or optical mechanisms. For example, communications interface 322 may include one or more RF transmitters, receivers and/or transceivers and one or more antennas for transmitting and receiving RF data via WWAN 115, such as cellular network 115 or a satellite network (not shown), as well as via short range network 135. Communications interface 322 may also include a modem or an Ethernet interface to a LAN or other mechanisms for communicating with elements in a network.

The exemplary configuration illustrated in FIG. 3A is provided for simplicity. It should be understood that UAV 110 may include more or fewer devices than illustrated in FIG. 3A.

Figure 3B:
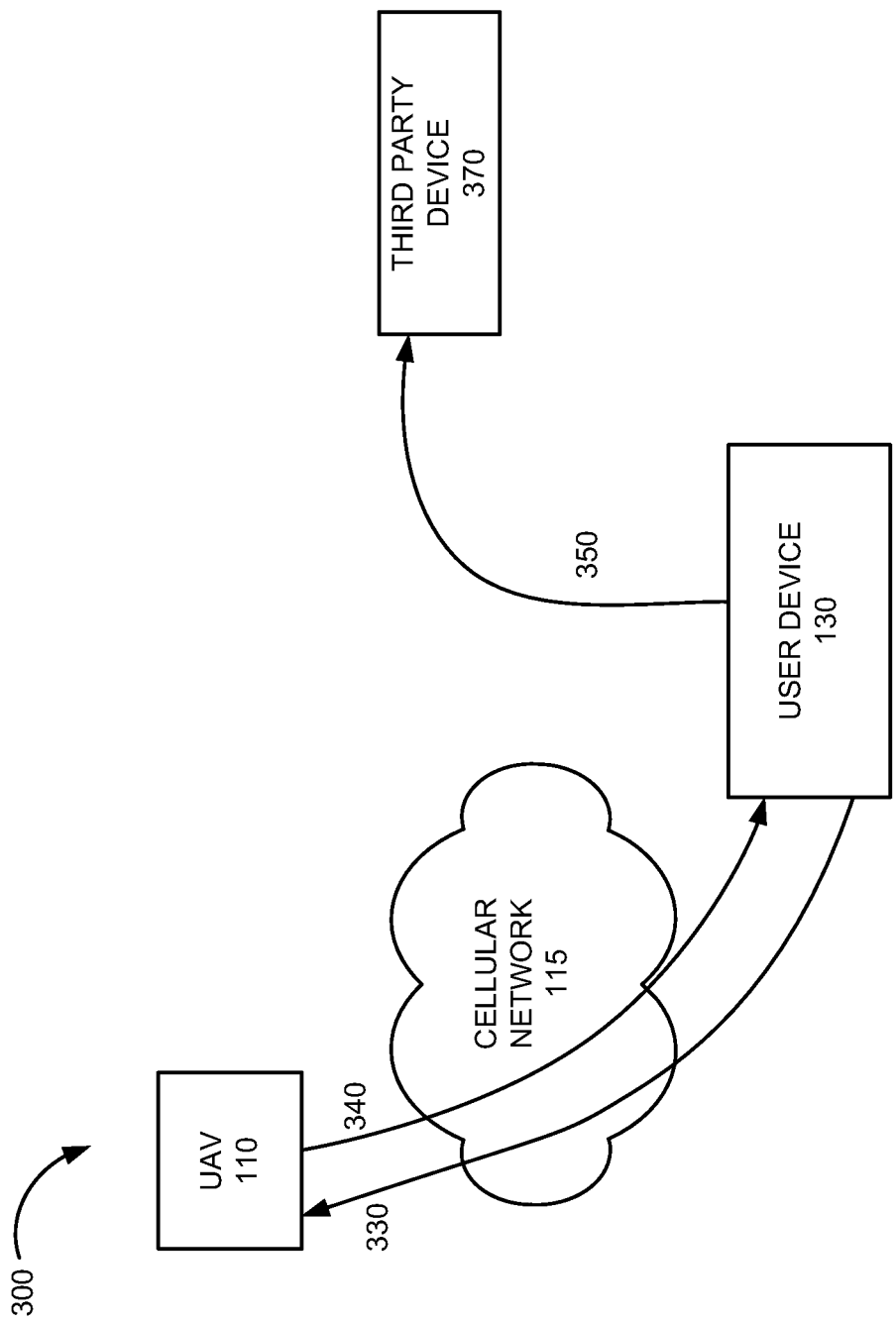
FIG. 3B illustrates another exemplary environment in which systems and methods described herein may be implemented.

FIG. 3B is a diagram illustrating an exemplary environment 300 in which systems and methods described herein may be implemented. Environment 300 may include UAV 110, cellular network 115, user device 130, and third party device 370.

As shown by line 330 in FIG. 3B, user device 130 may communicate with UAV 110 via cellular network 115. For example, a drone pilot may access an application stored on user device 130 and may send commands to UAV 110 via the application. In one implementation, user device 130 may transmit commands to UAV 110 (e.g., to flight control processor system 314) that control how UAV 110 flies (e.g., the direction, altitude, the velocity, etc.), and UAV 110 may transmit telemetry information reflecting its current operational status (e.g., airspeed, altitude, other sensor readings, navigation camera images).

User device 130 may also transmit commands to UAV 110 to capture images and transmit the images to user device 130. For example, user device 130 may transmit a command to UAV 110 (e.g., to payload systems 320 via payload API 318) to capture images with an onboard camera or sensor, store high resolution versions of the images on a storage device at UAV 110, and transmit a subset of lower resolution versions of the images to user device 130. In one implementation, user device 130 may indicate that UAV 110 should transmit the subset of lower resolution images on a periodic basis (i.e., transmit one image for every five, ten, or 20 images taken; transmit one image every minute, every five minutes, every ten minutes; etc.). In another implementation, user device 130 may send an instruction to UAV 110 indicating a time at which UAV 110 should transmit an image to user device 130. The frequency of transmission of the images may vary based on a type of images captured, a customer's preferences, how the images are being used, or other factors.

UAV 110 may capture the images based on the instructions received from user device 130, such as instructions received via payload API 318. UAV 110 may store high resolution versions of the images on a secure digital (SD) card or other non-volatile storage device on UAV 110. As shown by line 340 in FIG. 3B, UAV 110 may additionally send a subset of lower resolution images to user device 130 via cellular network 115 based on the instructions received from user device 130.

User device 130 may receive the subset of lower resolution images. In one implementation, user device 130 may receive the subset of images substantially in real time. For example, user device 130 may receive each lower resolution image shortly after each image is captured by UAV 110. In one implementation, user device 130 may display each image as the image is received. In another implementation, user device 130 may automatically store each lower resolution image when each image is received. For example, user device 130 may automatically store each image in memory 230. In another implementation, the images may be automatically stored in a photo management application stored on user device 130.

A user operating user device 130 (e.g., a drone pilot, a GCS operator, etc.) may view the images as they are received or after they have been stored. For example, the user may view the images to verify a quality of the images. In one implementation, if there is a problem with the images, the user may adjust parameters associated with UAV 110 via user device 130 to attempt to rectify any problems. For example, the user may change the camera settings of, for example, a high resolution camera included in payload systems 320 on UAV 110 by sending instructions via user device 130 to payload API 318. As another example, if the images include a sun flare, the user may instruct UAV 110 to capture images from a different angle to reduce the effect of the sun.

As shown by line 350, user device 130 may additionally transmit some or all of the received images to third party device 370 for storage or image processing. For example, user device 130 may transmit the images to third party device 370 via e-mail, multimedia message (MMS), an application on user device 130, or in another manner. Third party device 370 may include a user device (e.g., a mobile phone, tablet, personal computer, etc.), a storage device (e.g., server device, cloud storage, etc.), or another type of device. Third party device 370 may be associated with a customer, a stakeholder, an analyst, or another user.

In one example, third party device 370 may be a mobile phone, a tablet, a laptop computer, or another device associated with a user, such as a representative for a construction company that is constructing a building for a building owner. The user may conduct a meeting with, for example, the building owner and/or a lender who provided a loan for the building construction. The meeting may take place hundreds or thousands of miles away from the building site and the building owner and/or lender may want to verify that the construction is on schedule. In this example, an operator of user device 130 may fly UAV 110 near the building site, receive a subset of lower resolution images from UAV 110, and may transmit the subset of lower resolution images to third party device 370. While UAV 110 is still in the air, the user may request different images from different areas of the construction project. The operator of user device 130 may provide commands to UAV 110 to take additional images from different areas and transmit lower resolution versions of the images to user device 130 and user device 130 may transmit the images to third party device 370. Since the user is verifying work that has been completed on the building, it is not necessary to receive high resolution images. In addition, since the user is able to receive the images while UAV 110 is still in the air, the customer can easily review the images and request more images or different images.

FIG. 4 is a flow diagram illustrating processing associated with elements of environment 100 to validate imagery collected while UAV 110 is in flight. The steps described below may be performed by UAV 110, user device 130, third party device 370, and/or additional elements of environment 100.

Processing may begin with user device 130 transmitting instructions to UAV 110 (block 410). For example, user device 130 may transmit flight information (e.g., where to fly, the altitude of flight, the direction of flight, a flight pattern, etc.) and additional instructions to UAV 110 via cellular network 115. In one implementation, user device 130 may transmit instructions to UAV 110 to capture images while in flight. User device 130 may additionally transmit instructions to UAV 110 to transmit a lower resolution subset of the images to user device 130. For example, UAV 110 may be instructed to store high resolution images at a storage device at UAV 110 and transmit a lower resolution subset of the images to user device 130.

User device 130 may additionally indicate that the lower resolution images should be transmitted to user device 130 periodically. In one implementation, user device 130 may indicate that one image out of a predetermined number of images should be transmitted to user device 130 (e.g., one image out of every five, ten, 20, etc., images taken should be transmitted to user device 130). In another implementation, user device 130 may indicate that an image should be transmitted after a predetermined period of time (e.g., an image should be transmitted every 30 seconds, minute, etc.). In another implementation, user device 130 may indicate that UAV 110 should send an image upon request from user device 130.

In some implementations, UAV 110 may transmit images to user device 130 based on predetermined flight events. For example, application processor system 316 may signal a high resolution camera in payload systems 320 (e.g., in sensor systems 324) to capture images and/or video when UAV 110 is hovering at a particular location such as above a landing site or other area of interest, is located near a particular site (e.g., a building or a road), etc. Such predetermined flight events may be provided by user device 130, via payload API 318, or may be prestored in flight control processor system 314 prior to a flight and triggered when UAV 110 is located at the particular location, performing a particular action (e.g., hovering), etc. In each case, the high resolution camera may capture images and transmit the images via, for example, payload API 318 to user device 130.

User device 130 may additionally indicate that, if UAV 110 is able to communicate with user device 130 via short range network 135 (i.e., UAV 110 and user device 130 are close enough to communicate via short range network 135), the images should be transmitted via short range network 135. In one implementation, if the images are transmitted to user device 130 via short range network 135, the transmitted images may be high resolution images. In another implementation, the instructions may indicate that, if the images are transmitted via short range network 135, the frequency of transmitting the images may be different than the frequency of transmitting the images via cellular network 115. For example, user device 130 may instruct UAV 110 to transmit the images more frequently if the images are being transmitted via short range network 135 than if the images are being transmitted via cellular network 115.

User device 130 may receive lower resolution images from UAV 110 via cellular network 115 (block 420). For example, UAV 110 may capture high resolution images, store the high resolution images at UAV 110, and determine that the images cannot be transmitted via short range network 135 (e.g., via communications interface 322) based on, for example, the lack of availability of short range network 135, which may be based on the distance UAV 110 is located from user device 130. In this case, UAV 110 may transmit a subset of lower resolution versions of the images to user device 130 via cellular network 115 (or a satellite based network) based on the instructions received from user device 130. In one implementation, the lower resolution images may automatically be displayed on user device 130 as the images are received at user device 130. After receiving the images, user device 130 may store the lower resolution images at user device 130 (block 430). For example, as each image is received, user device 130 may automatically store the image in a local storage (e.g., a photo management application, a removable storage card, local memory, etc.).

User device 130 may transmit one or more of the images to third party device 370 (block 440). For example, an operator associated with user device 130 may transmit one or more of the images to third party device 130 via e-mail, MMS, an application on user device 130, or via another means. In one implementation, third party device 370 may be a user device associated with a customer. In another implementation, third party device 370 may be a device associated with an analyst or a stakeholder. In another implementation, third party device 370 may be a storage device (e.g., a server device, a drop box, cloud storage, etc.).

In some implementations, user device 130 may adjust parameters based on the received images (block 450). In one implementation, an operator of user device 130 may transmit instructions to UAV 110 via cellular network 115 to adjust parameters of the UAV 110 or the camera. For example, the operator of user device 130 may review the images and determine that parameters associated with UAV 110 should be adjusted. As another example, the operator of user device 130 may receive feedback from another user (e.g., a user associated with third party device 370) indicating that parameters associated with UAV 110 should be adjusted after the images are transmitted to third party device 370. In one implementation, user device 130 may transmit instructions to UAV 110 via, for example, payload API 318, to adjust camera settings. In another implementation, user device 130 may transmit instructions to UAV 110 via payload API 318 to adjust an angle at which the images are captured or to take additional images from a different location. In yet another implementation, user device 130 may instruct UAV 110 to return to the ground to remove debris from the camera lens.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

Further, while series of acts have been described with respect to FIG. 4 and signal flows with respect to FIG. 3B, the order of the acts and/or signal flows may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
sending, by a user device and via a wireless wide area network (WWAN), instructions to an unmanned aerial vehicle (UAV), wherein the instructions include instructions to:
capture a plurality of first images while the UAV is in flight,
store the first images having a first resolution on a storage device included in the UAV, and
transmit, at one of a predetermined time, periodically or after a predetermined number of first images have been captured, a plurality of second images having a second resolution to the user device, wherein the plurality of second images correspond to a subset of the plurality of first images and the second resolution is lower than the first resolution;

receiving, at the user device and while the UAV is in flight, one or more of the plurality of second images via the WWAN; and storing the one or more second images at the user device.

2. The method of claim 1, further comprising:

transmitting, by the user device, at least one second image of the one or more second images to a second device.

3. The method of claim 2, wherein the second device includes a second user device or a storage device.

4. The method of claim 1, wherein receiving the one or more second images includes periodically receiving each second image after the predetermined number of first images has been captured.

5. The method of claim 1, wherein receiving the one or more second images includes periodically receiving each second image after a predetermined time period.

6. The method of claim 1, further comprising:

sending, by the user device, instructions to adjust a parameter associated with capturing images by the UAV based on receiving the one or more second images.

7. The method of claim 1, wherein the instructions further comprise instructions to:

capture at least some of the plurality of first images based on at least one predetermined event, and store the plurality of first images at the UAV.

8. A user device comprising:

a memory; and a processor configured to:

send, via a wireless wide area network (WWAN), instructions to an unmanned aerial vehicle (UAV), wherein the instructions include instructions to:

capture a plurality of first images while the UAV is in flight, store the first images having a first resolution on a storage device included in the UAV, and transmit, at one of a predetermined time, periodically or after a predetermined number of first images have been captured, a plurality of second images having a second resolution to the user device, wherein the plurality of second images correspond to a subset of the plurality of first images and the second resolution is lower than the first resolution;

receive, while the UAV is in flight, one or more of the plurality of second images via the WWAN; and store the one or more second images in the memory.

9. The user device of claim 8, wherein the processor is further configured to:

transmit at least one second image of the one or more second images to a second device.

10. The user device of claim 9, wherein the second device includes a second user device or a storage device.

11. The user device of claim 8, wherein, when receiving the one or more second images, the processor is configured to periodically receive each second image after the predetermined number of first images has been captured.

12. The user device of claim 8, wherein, when receiving the one or more second images, the processor is configured to periodically receive each second image after a predetermined time period.

13. The user device of claim 8, wherein the processor is further configured to:

send, to the UAV, instructions to adjust a parameter associated with capturing images by the UAV based on receiving the one or more second images.

14. The method of claim 1, wherein the instructions further comprise instructions to store the plurality of first images at the UAV.

15. A non-transitory computer-readable medium having stored thereon sequences of instructions that, when executed by at least one processor included in a user device, cause the at least one processor to:

send, via a wireless wide area network (WWAN), instructions to an unmanned aerial vehicle (UAV), wherein the instructions include instructions to:

capture a plurality of first images while the UAV is in flight, store the first images having a first resolution on a storage device included in the UAV, and transmit, at one of a predetermined time, periodically or after a predetermined number of first images have been captured, a plurality of second images having a second resolution to the user device, wherein the plurality of second images correspond to a subset of the plurality of first images and the second resolution is lower than the first resolution;

receive, while the UAV is in flight, one or more of the plurality of second images via the WWAN; and store the one or more second images.

16. The non-transitory computer-readable medium of claim 15, wherein the instructions further cause the at least one processor to:

transmit at least one second image of the one or more second images to a second device.

17. The non-transitory computer-readable medium of claim 16, wherein the second device includes a second user device or a storage device.

18. The non-transitory computer-readable medium of claim 15, wherein the instructions that cause the at least one processor to receive the one or more second images include instructions that cause the at least one processor to periodically receive each second image after the predetermined number of the plurality of first images has been captured.

19. The non-transitory computer-readable medium of claim 15, wherein the instructions that cause the at least one processor to receive the one or more second images include instructions that cause the at least one processor to periodically receive each second image after a predetermined time period.

20. The non-transitory computer-readable medium of claim 15, wherein the instructions further cause the at least one processor to:

send, via the WWAN and to the UAV, instructions to adjust a parameter associated with capturing images by the UAV based on receiving the one or more second images.

* * * * *